US010640423B2

(12) United States Patent
Zampini et al.

(10) Patent No.: US 10,640,423 B2
(45) Date of Patent: May 5, 2020

(54) METHOD TO ARTIFICIALLY AGGLOMERATE FINELY DIVIDED MATERIALS

(71) Applicant: CEMEX RESEARCH GROUP AG, Brugg bei Biel (CH)

(72) Inventors: Davide Zampini, Lyss (CH); Alexandre Guerini, Cressier (CH); Giovanni Volpatti, Aegerten (CH)

(73) Assignee: CEMEX RESEARCH GROUP AG, Brugg bei Biel (CH)

( * ) Notice: Subject to any disclaimer, the term of this patent is extended or adjusted under 35 U.S.C. 154(b) by 114 days.

(21) Appl. No.: 15/567,538

(22) PCT Filed: May 26, 2015

(86) PCT No.: PCT/EP2015/061532
§ 371 (c)(1),
(2) Date: Oct. 18, 2017

(87) PCT Pub. No.: WO2016/188559
PCT Pub. Date: Dec. 1, 2016

(65) Prior Publication Data
US 2018/0105463 A1    Apr. 19, 2018

(51) Int. Cl.
C04B 18/02 (2006.01)
C04B 24/38 (2006.01)
C04B 111/00 (2006.01)

(52) U.S. Cl.
CPC ............ *C04B 18/021* (2013.01); *C04B 24/38* (2013.01); *C04B 2111/0075* (2013.01);
(Continued)

(58) Field of Classification Search
CPC ....... C04B 18/021; C04B 18/02; C04B 24/38; Y02W 30/91; Y02W 30/95
See application file for complete search history.

(56) References Cited

U.S. PATENT DOCUMENTS

| 5,693,137 A | 12/1997 | Styron | |
|---|---|---|---|
| 2014/0238276 A1* | 8/2014 | Baalbaki | C04B 28/082 106/790 |
| 2014/0296370 A1* | 10/2014 | Ferrari | C04B 18/021 523/122 |

FOREIGN PATENT DOCUMENTS

| EP | 2468695 A1 | 6/2012 |
|---|---|---|
| EP | 2883849 A1 | 6/2015 |

(Continued)

OTHER PUBLICATIONS

International Search Report dated Feb. 3, 2016 for PCT/EP2015/061532.
Written Opinion dated Feb. 3, 2016 for PCT/EP2015/061532.

*Primary Examiner* — Pegah Parvini
(74) *Attorney, Agent, or Firm* — Lucas & Mercanti, LLP

(57) ABSTRACT

Method to artificially agglomerate finely divided materials. A method to agglomerate finely divided material into aggregates, the aggregates being larger than the finely divided material, comprising the steps of (a) mixing finely divided material, binder and water in a mixer, (b) adding an agglomerating agent to the mix formed in step (a) and mixing constantly. Finely divided material is selected from the group consisting of cement, sand, clay, glass, slag, fly ash, stone powder, bypass dust, limestone, silica fume, crushed brick, brick powder and crushed stone or a combination thereof.

15 Claims, 4 Drawing Sheets

(52) U.S. Cl.
CPC ............. *Y02W 30/92* (2015.05); *Y02W 30/94* (2015.05); *Y02W 30/95* (2015.05)

(56) References Cited

FOREIGN PATENT DOCUMENTS

| | | | |
|---|---|---|---|
| EP | 2930267 | A1 | 10/2015 |
| JP | H1192188 | A | 4/1999 |
| JP | 2011062943 | A | 3/2011 |
| JP | 2014087723 | A | 5/2014 |

\* cited by examiner

METHOD TO ARTIFICIALLY AGGLOMERATE FINELY DIVIDED MATERIALS

CROSS REFERENCE TO RELATED APPLICATION

This Application is a 371 of PCT/EP2015/061532 filed on May 26, 2015, which is incorporated herein by reference.

FIELD OF THE INVENTION

The present invention relates to a method to agglomerate finely divided materials into a coarser material. Particularly, the present invention relates to a method to prepare agglomerated artificial aggregates from fine materials to be used in diverse applications, including but not limited to base and/or subbase in the construction of functional roads or pavements, decorative purposes and/or being used as total or partial substitute of aggregates in normal concrete for various functions. Furthermore, through this method one can produce artificial aggregates from fine materials with a targeted particle size distribution and mechanical performance.

BACKGROUND OF THE INVENTION

Concrete may be defined as a binder and water paste, together with aggregate particles mixed in. Aggregates may be defined as fine and coarse aggregates and they occupy 60 to 75% of the volume of concrete. According to the ACI Education Bulletin E1-99 ("Aggregates for Concrete"), the portion of an aggregate passing a 4.75 mm (N° 4) sieve and predominantly retained on the 75 μm (N° 200) sieve is called fine aggregate, and larger aggregate (bigger than 4.75 mm) is called coarse aggregate. Sand is an example of a commonly used fine aggregate, while gravel or crushed stone, in particles larger than 4.75 mm, are considered examples of coarse aggregate.

The properties of aggregates affect the workability, durability, strength, thermal properties and density of the hardened concrete and therefore are a key ingredient in the mix design.

For example, an excess of finer particles (<75 μm), such as silt, clay or fine dust, may impact negatively the quality of the hardened concrete, reducing the overall strength gain in the final product. ASTM C117 standards (Standard Test Method for Materials Finer than 75-μm) preview a maximum limit of 10% for such smaller particles in the fine aggregate, while BS EN 12620:2002 (British Standard—Aggregates for Concrete) establishes a limit of 3% for said components.

When the fine aggregate has a high content of smaller particles, it needs to be washed so that the content of smaller particles is reduced to allowable values, to ensure that the properties of the final product are not compromised. This leads to a high water consumption that at the end of the process is contaminated with the fines removed from the aggregate. This water has to be treated or disposed of, with the obvious environmental problems that this entails.

The alternative to the washing procedure of the fine aggregate is its disposal, since it cannot be used as a construction material, normally by being landfilled, which represents a tremendous waste and also causes an environmental issue.

It has been found that it is possible to convert aggregates, including but not limited to fine aggregates, for example sand or brick dust, into granules with customized physical and mechanical properties, depending on the final application that is desired, such as permeable pavements' subbase or base, decorative purposes or even as total or partial replacement of coarse aggregates in concrete. Furthermore, this invention allows the use of various types of fine aggregates that normally would not meet the requirements of usage in the construction industry and would have to be disposed of, such as waste mud, recycled sand or fine aggregate with high content of smaller particles, such as slit, clay or other impurities, therefore contributing as an alternative to disposal sites and associated constraints (shortage of disposal sites, long transportation distances, law restrictions, etc.).

Furthermore, in case the aggregates are used as aggregates to build a permeable pavement, the final pavement should have low content of fines (passing 0.063 mm no more than 5% and 0.125 mm no more than 20%), so that it has a high proportion of void spaces which will act as reservoirs, gradually releasing the water into the environment over a period of time, therefore reducing the possibility of a flood. The present invention results in aggregates whose size can be predicted, therefore tailored for applications such as the construction of permeable roads.

In addition, in case the aggregates are used as a base for functional roads, the final product should also have good mechanical properties, in order to be able to carry the weight of the layers above itself, as well as the weight of vehicles. Therefore, good resistance against abrasion and fragmentation is needed (Los Angeles test should be maximum 60), which can be achieved using the present method.

The Los Angeles (L.A.) abrasion test is a method to assess how hard an aggregate is and its abrasion properties. These are important because the aggregates used in pavements must resist crushing, degradation and disintegration to ensure the endurance of the future pavement.

The presence method not only works with fine aggregates, but also with bigger aggregated, up to 30 mm, which can be agglomerated to produce gabions or for decorative purposes.

Some applications already disclose the process of turning fine aggregates into a granular material:

DE2110498 relates to a process for preparing grain shape expanded ceramic materials that can be used as aggregates for lightweight concrete. This process encompasses 1) the mixing and homogenization of the starting material with water, 2) forming granules by rolling the material and coating it with a cement layer and 3) drying such granules in an oven at 1000° C.-1200° C. The process does not provide a method to control the physical and mechanical properties of the granules produced; also, the complexity of this process does not allow it to be performed at the jobsite, like the present invention does.

DE3315206 refers to a method to produce sand granules to be used as concrete aggregates, in substitution of the gravel or crushed stone. The sand is agglomerated into bigger spheres with the addition of liquid and optionally with a binder. After, the spheres are added to concrete. The method does not disclose the usage of clayey/silty sand and it shows no results, therefore any indication on how to control the granules' properties and/or the characteristics of the final spheres obtained, thus their applicability is limited or even uncertain.

CN103880371 provides a method for preparing artificial aggregate from sludge and mud with high sand contents. First, the initial material is filtered to remove the particles with high particle diameter; then, it is mixed with binder (cement, and fly ash, and born lime, and slag, and silicon ash), activator, early strength agent and water. Granules are then formed and, after cured, are added to cement as gravel substitute to produce concrete. There is no indication of the final properties of the granules, consequently it does not disclose a method on how to control said properties.

In conclusion, the prior art has not so far disclosed a method to customize the properties of the aggregates produced, in terms of particle size and mechanical performance, tailoring them to diverse applications in the construction industry sector.

The problem to be solved is providing a method to reuse finely divided material even fines that would normally be disposed of, such as fines with high clay content to produce coarser aggregated material.

DESCRIPTION OF THE INVENTION

The present invention provides a method to agglomerate finely divided material into aggregates, the aggregates being larger than the finely divided material, comprising the steps of:

(a) mixing finely divided material, binder and water in a mixer, (b) adding an agglomerating agent to the mix formed in step (a) and (c) mixing constantly, wherewith method of the invention.

In step (a) of the method of the invention, the finely divided material may be, but is not limited to, fine aggregates. The invention allows the use of any material where most of its particles (90%) are smaller than 30 mm; said fine material, up to 30 mm, may be agglomerated for decorative purposes and/or to produce gabions, for instance. Examples of finely divided material that can be used according to the embodiment of this invention are cement, sand, clay, glass, slag, fly ash, stone powder, bypass dust, limestone, silica fume, crushed brick, brick powder, crushed stone or a combination thereof.

The amount of aggregate should be in the range between 0.1 ton and 3.2 ton per $m^3$ of mix.

According to the method of the invention, the volume of mix can be described as the total volume of the individual materials added, meaning that no voids are taken into account when describing such volume. It can be measured by accounting the densities of the raw materials used and respective masses added, knowing that the density of a material is defined by mass per unit volume. This means that one takes into account the water that will be absorbed into the body of the particles, while the surface of the particles remains "dry"—Saturated-Surface-Dry (SSD) moisture state. All the concentrations mentioned in this invention are mass per cubic meter, whereas said cubic meter is always defined as described in this paragraph.

In step (a) of the method of the invention, the binder is any material that can join the other ingredients together. Examples of binders that can be used according to the embodiment of this invention are cement—in powder or mixed with water, including but not limited to mortar or concrete not yet set (for instance, returned concrete)—, lime, bypass dust, silica fume, fly ash, slag or a combination thereof.

The components in step a) can be added all together in one single step or, alternately, water and binder material can be added gradually to the finely divided material.

Thus, another embodiment is the method of the invention, wherein in step (a) finely divided material, binder and water are added simultaneously.

Another embodiment is the method of the invention, wherein in step (a) water and binder are added gradually to said finely divided material.

Another embodiment is the method of the invention, wherein said finely divided material is selected from the group consisting of cement, sand, clay, glass, slag, fly ash, stone powder, bypass dust, limestone, silica fume, crushed brick, brick powder and crushed stone or a combination thereof.

Another embodiment is the method of the invention, wherein said finely divided material is at a concentration in the range of 0.1 ton/$m^3$ to 3.2 ton/$m^3$ with respect to the final mix.

Another embodiment is the method of the invention, wherein said binder is selected from the group consisting of powder cement, cement mixed in water, mortar, concrete not yet set, returned concrete, lime, bypass dust, silica fume, fly ash and slag or a combination thereof.

Another embodiment is the method of the invention, wherein said binder is at a concentration in the range of 10 to 1000 kg/$m^3$ with respect to the final mix.

A superplasticizer (e.g. based on melamine, naphthalene, lignosulfonate or polycarboxylates) can also be added in step (a) to optimize the consistency of the mix. This will improve the workability of the mix, allowing for a better performance of the agglomerating agent. The solid active content of the superplasticizer is at a concentration between 0.1 kg/$m^3$ and 10 kg/$m^3$.

Thus, another embodiment is the method of the invention, wherein in step (a) a superplasticizer is added to the mix.

Another embodiment is the method of the invention, wherein said superplasticizer is selected from the group consisting of melamine, naphthalene, lignosulfonate and polycarboxylates or a combination thereof.

Another embodiment is the method of the invention, wherein the solid active content of the superplasticizer is at a concentration in the range of 0.1 kg/$m^3$ to 10 kg/$m^3$.

Another embodiment is the method of the invention, wherein in step (a) water to binder ratio (wt/wt) is in the range of 0.5 to 10.

Another embodiment is the method of the invention, wherein said agglomerating agent is selected from the group consisting of cellulose, chitosan, polyacrylics, polyamines, polyethylene imines, polyvinylalcohols, polysaccharides, polyacrylamides, and co-polymers thereof, collagen, acrylamide, lactic acid, methacrylic acid, methacrylate, hydroxyethyl, ethylene glycol, ethylene oxide, acrylic acid, inorganic flocculants and inorganic coagulants or a combination thereof.

Another embodiment is the method of the invention, wherein said agglomerating agent is inorganic flocculants or polysaccharides.

Another embodiment is the method of the invention, wherein the solid active content of the agglomerating agent is at a concentration in the range of 0.1 kg/$m^3$ to 5 kg/$m^3$.

The aggregates obtained by the method of the invention may be poured out of the mixer and dried for at least 6 hours, until the weight of a sample has changed less than 0.1% over subsequent weightings. The aggregates may be air dried or using an oven, at a temperature not superior to 100° C., preferably the aggregates should be dried at a temperature between −10° C. and 100° C. Aggregates can be exposed to precipitation, as long as they are left to dry after, until the weight of a sample has changed less than 0.1% over subsequent weightings. The aggregates can also be cured by spraying or sprinkling water, to avoid sudden water loss and cracking. This prevents the aggregates moisture from evaporating, contributing to the strength gain of the final aggregate.

Thus, another embodiment is the method of the invention, wherein the aggregates obtained in step (c) are poured out of the mixer and dried for at least 6 hours.

Another embodiment is the method of the invention, wherein the aggregates obtained in step (c) has an agglomerability of at least 30, where said "Agglomerability" is defined as $$AI = FM_{RM} \times \frac{D_{90}}{D_{10}}$$

wherein $FM_{RM}$ is the fineness modulus of the finely divided material used in step (a), defined as the sum of the total percentage of sample that pass the following series of sieves: 0.063 mm, 0.125 mm, 0.250 mm, 0.500 mm, 1 mm, 2 mm and 4 mm $$FM_{RM} = \Sigma_{(0.063\ mm\text{-}4\ mm)}\ \text{passing \%},$$

wherein $D_{10}$ is the sieve size [mm] at which the passing is 10%, wherein $D_{90}$ is the sieve size [mm] at which the passing is 90% and $D_{90}/D_{10}$ is a monogranular index.

Another embodiment is the method of the invention, wherein in step (a) a nucleating agent is added to the mix.

Another embodiment is the method of the invention, wherein said nucleating agent is selected from the group consisting of cement, sand, clay, glass, slag, fly ash, stone powder, bypass dust, limestone and silica fume or a combination thereof.

Fibers can be added to the mix in step a) to increase the toughness and overall durability of the final material. The dosage of such fibers is between 0 to 10% (v/v).

In step (c) of the method of the invention, the mixing is carried out between 1 minute and 15 minutes, or until the totality of the initial finely divided material is visibly agglomerated. Any mixer can be used to blend the ingredients, for example disc pelletizers, paddle mixers, drum pelletizers, pin mixer agglomerators, ribbon blenders, single paddle mixers, planetary mixer or even a pug mill or the rotary drum of a traditional concrete truck.

The agglomerates obtained by the method of the invention may be used as a base or subbase; when no specific mechanical properties are desired, the agglomerates can be directly poured into the sub-base and uniformly distributed manually or mechanically.

Another embodiment is the method of the invention, wherein the agglomerated aggregate is uniformly distributed using a motor grader, which is a piece of machinery used in construction, more specifically used in creating flat surfaces and in preparing a base course for paved roads.

Another embodiment is the method of the invention, wherein the aggregate once placed on the base/subbase is compacted using a roller.

Another embodiment is the method of the invention, wherein the aggregates obtained by the method of the invention are used in decorative architectonic constructions, such as colored paths, colored pavements, or exposed aggregate concrete. Pigments can be added to the mix in step (a) of the method to fulfill this purpose; said pigments can be organic or inorganic and may be added in a concentration between 0-100 kg/m$^3$ of mix, depending on the intensity of the color desired.

Another embodiment is the method of the invention, wherein the aggregates obtained by the method of the invention are used as aggregates for fresh concrete.

Another embodiment is the method of the invention, wherein the "agglomerability" of the initial finely divided material can be predicted through:

$$AI = FM_{RM} \times \frac{D_{90}}{D_{10}} \qquad \text{eq. 1}$$

Equation 1 allows us to calculate the "Agglomerability index", "AI".

AI may be between 0 and 1,000. "Agglomerabillity" is an index that predicts the capability of the initially finely divided material to be agglomerated. If the index is below 30, agglomeration is possible if an external nucleation agent is added, for example, bypass dust, in a concentration between 1 to 50% of the total weight; when AI is above 30, the material can be agglomerated by only adding binder, water and agglomerating agent.

$FM_{RM}$ in equation 1 is the fineness modulus of the initial finely divided material, defined as the sum of the total percentage of sample of the initial finely divided material that pass the following series of sieves: 0.063 mm, 0.125 mm, 0.250 mm, 0.500 mm, 1 mm, 2 mm and 4 mm:

$$FM_{RM} = \Sigma_{(0.063\ mm\text{-}4\ mm)}\ \text{passing \%} \qquad \text{eq. 2}$$

$D_{10}$ in equation 1 is the sieve size [mm] at which the passing is 10%

$D_{90}$ in equation 1 is the sieve size [mm] at which the passing is 90% and $D_{90}/D_{10}$ is a monogranular index.

Another embodiment is the method of the invention, wherein the particle size distribution can be predicted through the formula:

$$FM_{FM} = k \cdot \text{Log}_{10}\left(\frac{PV}{AI} \cdot 100\right) \qquad \text{eq. 3}$$

wherein $FM_{FM}$ is the fineness modulus of the final mix, defined as the sum of the total percentage of sample of the final mix (agglomerated material, obtained in step (c)) that pass the following series of sieves: 0.063 mm, 0.125 mm, 0.250 mm, 0.500 mm, 1 mm, 2 mm and 4 mm:

$$FM_{FM} = \Sigma_{(0.063\ mm\text{-}4\ mm)}\ \text{passing \%} \qquad \text{eq. 4}$$

k is a constant that depends of the initial finely divided material chosen and that can be calculated using equation 3.

PV represents the paste volume [l/m$^3$]

AI represents the "agglomerability" of the raw material, calculated through equation 1.

The paste volume represents the water volume in the system, plus the volume of the particles with a dimension smaller than 0.063 mm.

When the Agglomerability Index is inferior to 30, and a nucleating agent needs to be added, said amount of nucleating agent to be added can be calculated knowing the Fineness Modulus and Particle Size Distribution for the initial finely divided material, as well as for the nucleating agent, and calculating the Fineness Modulus and the Particle Size Distribution of the final mix using equation 3.

The nucleating agent needs to be a finer material than the finely divided material initially used. Therefore, the nucleating agent may be the binder itself, as long as its particle size distribution is smaller than the initial finely divided material. The nucleating agent can be, for example cement, sand, clay, glass, slag, fly ash, stone powder, bypass dust, limestone, silica fume or a combination thereof, having a particle size where more than 90% of the nucleating agent particles pass a 15 mm sieve. The nucleating agent will interfere with the mix by creating a hierarchy material where the smaller particles will interact with the bigger particles, aggregating around them, creating bigger spherical agglomerations.

According to the method of the invention, k is between 0.2 and 4, depending of the initial materials used.

According to the method of the invention, the fineness modulus of the produced aggregates is between 0 and 7.

According to the method of the invention, more than 80% of the aggregates formed in step (c) have a particle size higher than 0.063 mm.

According to the method of the invention, the aggregates formed in step (c) have a Los Angeles value (according to AASHTO T 96 or ASTM C 131) below 60.

The mechanical properties can be predicted through a correlation between the Fineness Modulus, calculated through equation 4, and the Los Angeles value.

EXAMPLES OF THE INVENTION

Example 1

Figure 1:
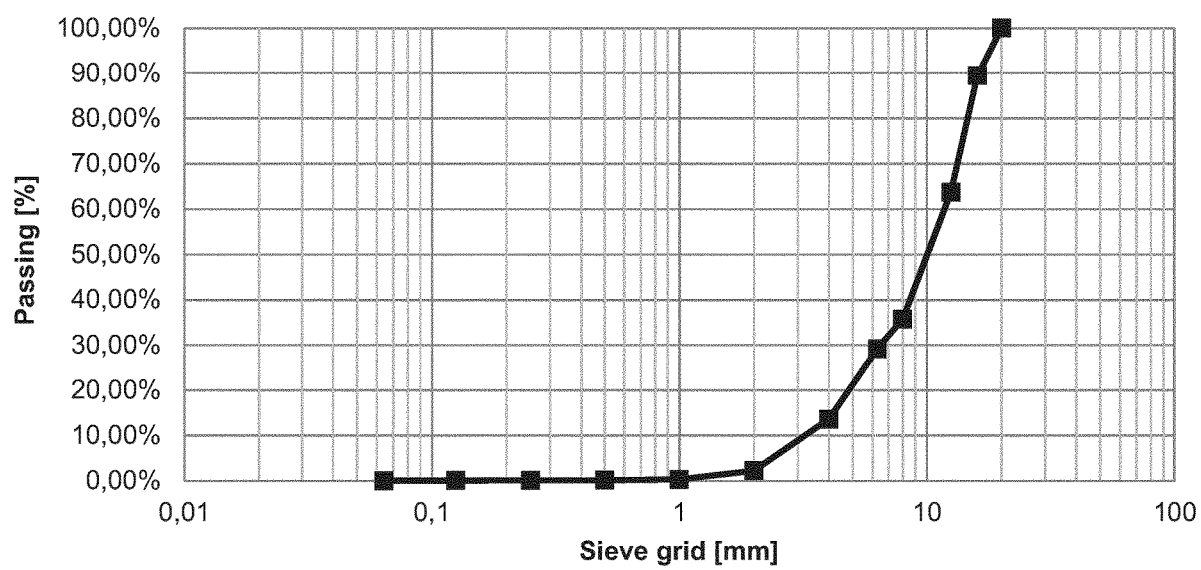
FIG. 1 shows the initial Particle Size Distribution (PSD) of the sand for example 1.

Six sand samples were agglomerated according to the method of the invention. The initial composition is shown in Table 1. The initial Particle Size Distribution (PSD) of the sand used as fine material is presented in FIG. 1.

TABLE 1

| | | Composition | | | | | | |
|---|---|---|---|---|---|---|---|---|
| N. | Name | CEM I 52.5 R kg/m³ | CEM I 52.5 white kg/m³ | w/b eff | w/b tot | Aggregates 0/4 round | Aggregates 0/4 crushed | Additive: Flocculant kg/m³ |
| A | Gravel from sand-vA | 300 | | 0.7 | 0.76 | 0% | 100% | 0.5 |
| B | Gravel from sand-vB | 300 | | 0.6 | 0.662 | 0% | 100% | 0.5 |
| C | Gravel from sand-vC | 350 | | 0.6 | 0.65 | 0% | 100% | 0.5 |
| D | Gravel from sand-vD | 400 | | 0.6 | 0.64 | 0% | 100% | 0.5 |
| E | Gravel from sand-vE white | — | 300 | 0.7 | 0.76 | 0% | 100% | 0.5 |
| F | Gravel from sand-vF white | — | 350 | 0.7 | 0.747 | 0% | 100% | 0.5 |

The density of the final material can be predicted knowing the density of the initial finely divided material, binder and the mix design used:

$$\rho_f = \frac{(\rho_1 \times v_1) + (\rho_2 \times v_2) + \ldots (\rho_i \times v_i)}{v_1 + v_2 + \ldots + v_i} \quad \text{eq. 5}$$

where $p_f$ represents the density of the final mix, $(\rho_1, \rho_2, \ldots, \rho_i)$ represent the densities of the "i" initial materials used and $(v_1, v_2, \ldots, v_i)$ represent the initial volumes of the "i" materials used.

The Fineness Modulus of the final mix can be predicted from the Paste Volume if one correlates both parameters in a Linear Regression. Example 2 shows said correlation for the specific finely divided material used. From the Fineness Modulus, one can then predict the pellatibility of the mix, according to equation 1.

The water absorption of the final aggregates obtained can be determined according to the European Norm EN 1097-6 or ASTM C 128.

For each mix, the finely divided material(sand), binder (CEM I 52,5—both grey and white were used) and water were added and mixed for 2 minutes. After, the agglomerating agent, a flocculant in this case, was added and spheres were produced after 5 minutes.

Figure 2:
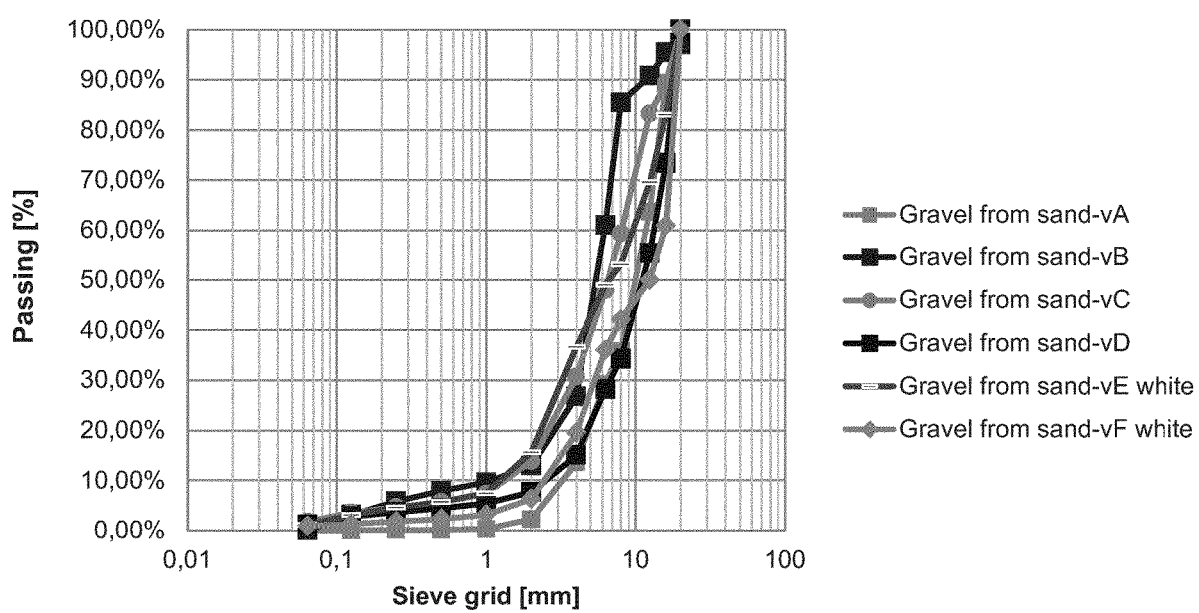
FIG. 2 shows the Los Angeles test results of the obtained agglomerated aggregates in example 1.

The spheres were then left to dry for 8 hours. The characteristics of the hardened spheres can be seen in Table 2 and FIG. 2.

TABLE 2

| N. | Name | Hardened properties Los Angeles 7 days |
|---|---|---|
| A | Gravel from sand-vA | 50.1 |
| B | Gravel from sand-vB | 59.2 |
| C | Gravel from sand-vC | 56.6 |
| D | Gravel from sand-vD | 46.8 |
| E | Gravel from sand-vE white | 47.2 |
| F | Gravel from sand-vF white | 61.8 |

The Los Angeles values obtained for the hardened aggregates indicate that the granules obtained have good abrasion resistance and therefore may be used as base in functional roads.

Example 2

Figure 3:
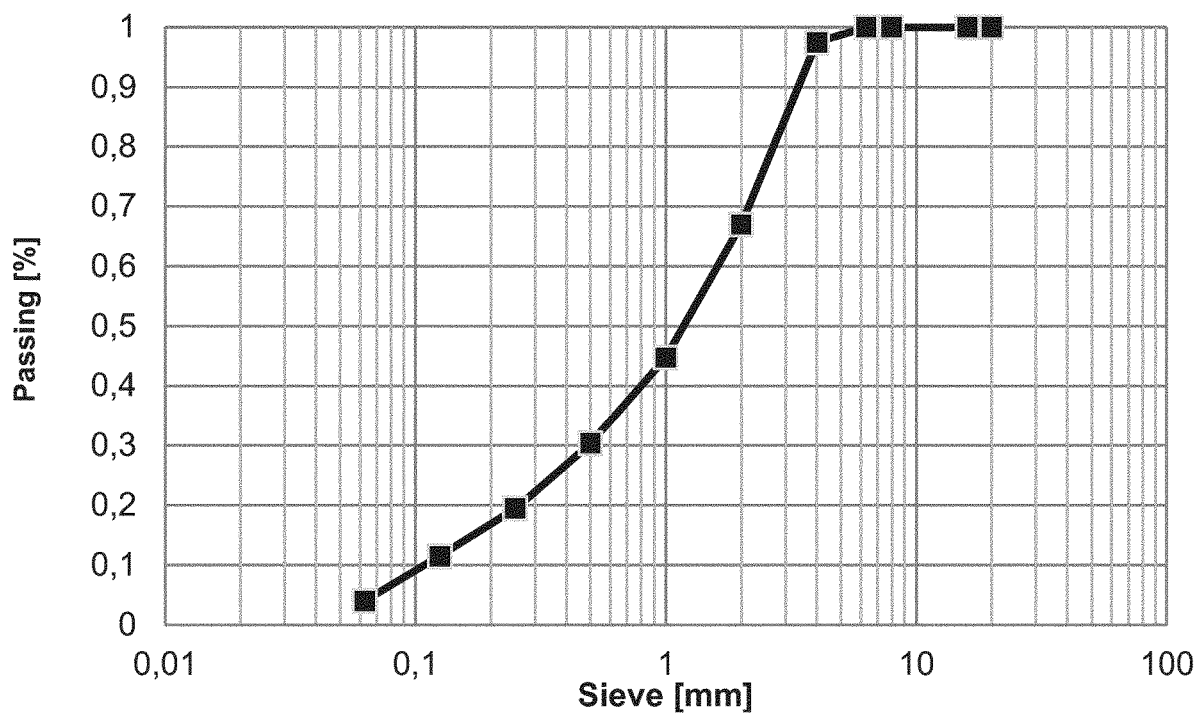
FIG. 3 shows the initial Particle Size Distribution (PSD) of the finely divided material for example 2.

0/4 aggregate was used for this second example. The Particle Size Distribution of the original material is plotted in FIG. 3:

The initial finely divided material was then mixed with a binder, water and mixed for 5 minutes. The compositions of the initial mixes are presented in Table 4:

TABLE 3

| | | Composition | | | | | | | |
|---|---|---|---|---|---|---|---|---|---|
| N. | Name | CEM I 52.5 R kg/m3 | Fly ash kg/m3 | TOTAL BINDER kg/m3 | w/b eff | w/b tot | Aggregates 0/4 round | Additives [kg/m3] Anionic Floculant | Density kg/m3 |
| 1 | Sand 0/4 crushed-v1 | 45 | 0 | 45 | 3 | 3.5 | 2201 | 0.75 | 2403.50 |
| 2 | Sand 0/4 crushed-v2 | 97 | 0 | 97 | 1 | 1.233 | 2258 | 0.5 | 2474.60 |
| 3 | Sand 0/4 crushed-v3 | 143 | 0 | 143 | 1 | 1.147 | 2097 | 0.5 | 2404.02 |
| 4 | Sand 0/4 crushed-v4 | 31.5 | 13.5 | 45 | 2.73 | 3.224 | 2230 | 0.75 | 2363.06 |
| 5 | Sand 0/4 crushed-v5 | 68 | 29.2 | 97.2 | 1 | 1.23 | 2250 | 0.75 | 2401.64 |
| 6 | Sand 0/4 crushed-v6 | 100 | 43 | 143 | 1 | 1.14 | 2087 | 0.5 | 2301.00 |
| 7 | Sand 0/4 crushed-v7 | 51 | 22 | 73 | 1 | 1.313 | 2336 | 0.75 | 2453.96 |
| 8 | Sand 0/4 crushed-v8 | 16 | 7 | 23 | 4.67 | 5.7 | 2293 | 0.75 | 2400.20 |
| 9 | Sand 0/4 crushed-v9 | 23 | 0 | 23 | 3.7 | 4.68 | 2351 | 0.5 | 2481.64 |
| 10 | Sand 0/4 crushed-v10 | 73 | 0 | 73 | 1.19 | 1.487 | 2311 | 0.5 | 2492.55 |
| 11 | Sand 0/4 crushed-v11 | 31.5 | 13.5 | 45 | 2.73 | 3.224 | 2230 | 0.75 | 2363.06 |
| 12 | Sand 0/4 crushed-v12 | 16 | 7 | 23 | 4.67 | 5.7 | 2293 | 0.75 | 2400.20 |
| 13 | Sand 0/4 crushed-v13 | 23 | 23 | 46 | 2.73 | 3.222 | 2228 | 0.75 | 2395.00 |
| 14 | Sand 0/4 crushed-v14 | 12 | 12 | 24 | 4.67 | 5.625 | 2277 | 0.75 | 2413.00 |
| 15 | Sand 0/4 crushed-v15 | 14 | 32 | 46 | 2.73 | 3.222 | 2225 | 0.75 | 2393.00 |
| 16 | Sand 0/4 crushed-v16 | 8 | 18 | 26 | 4.67 | 5.58 | 2262 | 0.75 | 2404.00 |

Figure 4:
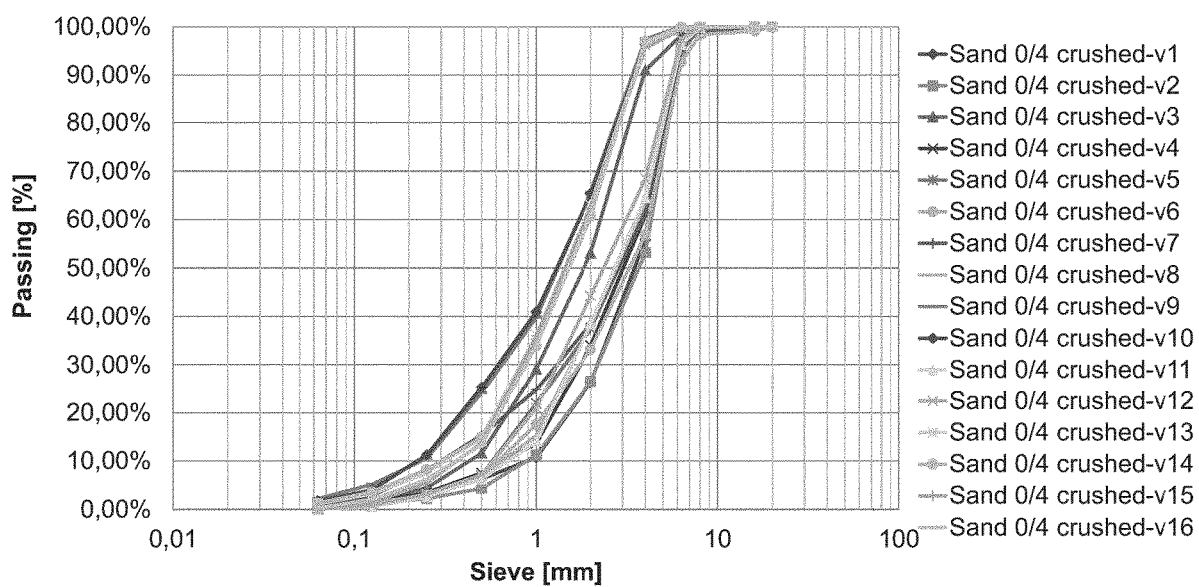
FIG. 4 shows the Los Angeles test results of the obtained agglomerated aggregates in example 2.

After the flocculant was added, spheres were formed. The spheres were then left to air dry for 24 hours, at an average temperature of 16° C. The properties of said spheres are presented in Table 3 and FIG. 4.

TABLE 4

| N. | Name | Fineness modulus (0.063--->4) $FM_{FM}$ | Paste volume [l/m3] PV | Agglomerability of the raw material Al | PV/Al | Log10 (PV/Al*100) | $FM_{FM}$*Log10 | $FM_{FM}$/Log10 |
|---|---|---|---|---|---|---|---|---|
| 1 | Sand 0/4 crushed-v1 | 1.99 | 149.29 | 85.32049535 | 1.75 | 2.24 | 4.45769639 | 0.88606491 |
| 2 | Sand 0/4 crushed-v2 | 1.93 | 127.79 | 85.32049535 | 1.50 | 2.18 | 4.206282692 | 0.888787393 |
| 3 | Sand 0/4 crushed-v3 | 1.92 | 188.40 | 85.32049535 | 2.21 | 2.34 | 4.503722446 | 0.819688635 |
| 4 | Sand 0/4 crushed-v4 | 2.16 | 138.48 | 85.32049535 | 1.62 | 2.21 | 4.785148923 | 0.979458265 |
| 5 | Sand 0/4 crushed-v5 | 2.28 | 130.95 | 85.32049535 | 1.53 | 2.19 | 4.987969486 | 1.0437525 |
| 6 | Sand 0/4 crushed-v6 | 2.11 | 192.66 | 85.32049535 | 2.26 | 2.35 | 4.973597649 | 0.897743144 |
| 7 | Sand 0/4 crushed-v7 | 2.47 | 98.36 | 85.32049535 | 1.15 | 2.06 | 5.087821018 | 1.196902434 |
| 8 | Sand 0/4 crushed-v8 | 2.24 | 115.41 | 85.32049535 | 1.35 | 2.13 | 4.782411029 | 1.052952103 |
| 9 | Sand 0/4 crushed-v9 | 2.45 | 92.40 | 85.32049535 | 1.08 | 2.03 | 4.982965533 | 1.203701152 |
| 10 | Sand 0/4 crushed-v10 | 2.45 | 110.04 | 85.32049535 | 1.29 | 2.11 | 5.17016947 | 1.160720717 |
| 11 | Sand 0/4 crushed-v11 | 2.23 | 138.48 | 85.32049535 | 1.62 | 2.21 | 4.924623935 | 1.008007001 |
| 12 | Sand 0/4 crushed-v12 | 2.42 | 115.41 | 85.32049535 | 1.35 | 2.13 | 5.163269483 | 1.136806399 |
| 13 | Sand 0/4 crushed-v13 | 2.22 | 142.46 | 85.32049535 | 1.67 | 2.22 | 4.940922497 | 1.000147595 |
| 14 | Sand 0/4 crushed-v14 | 2.20 | 120.89 | 85.32049535 | 1.42 | 2.15 | 4.722294645 | 1.020321117 |
| 15 | Sand 0/4 crushed-v15 | 2.15 | 143.36 | 85.32049535 | 1.68 | 2.23 | 4.779515958 | 0.9651177 |
| 16 | Sand 0/4 crushed-v16 | 2.14 | 131.46 | 85.32049535 | 1.54 | 2.19 | 4.676208125 | 0.977018373 |

From all the results obtained for $FM_{FM}/Log\ 10$, which were presented in Table 4, one could calculate the average constant, k, for this material.

TABLE 5

| $FM_{FM}/Log10$ | |
|---|---|
| Average | 1.014824 |
| Variance | 0.013132 |

The constant k is then 1.015. With this constant, one can then predict the Fineness Modulus of the hardened particles obtained with this specific initial aggregate, as a function of the Paste Volume used:

$$FM_{FM} = 1.015 \cdot Log_{10}\left(\frac{PV}{85.32} \cdot 100\right)$$

The spheres formed were then added to fresh concrete as coarse aggregates.

The method has the clear advantages of, not only allowing the production of agglomerated material, starting with any material with a particle size below 30 mm, but also predicting the Fineness Modulus of the final aggregates according to the initial paste volume used.

Therefore, one knows, according to the method of the invention, what type of Particle Size Distribution will be obtained from the initial paste volume used.

Example 3

The humidity, density, water absorption, as well as the Fineness Modulus, were calculated for three types of sand samples:

TABLE 6

| Sample | Humidity [%] | Density [kg/m3] | Water absorption [%] |
|---|---|---|---|
| Sand L | 11.06% | 2391 | 0.31% |
| Sand M | 8.14% | 2662 | 0.80% |
| Sand S | 7.44% | 2504 | 0.38% |

TABLE 7

| | Particle Size distribution [% of Passing at the following sieves in mm] | | | | | | | | | |
|---|---|---|---|---|---|---|---|---|---|---|
| Sample | Bottom | 0.0063 | 0.125 | 0.25 | 0.5 | 1 | 2 | 4 | 8 | 16 | 20 |
| Sand L | 0.00% | 3.00% | 12.87% | 42.57% | 94.25% | 99.05% | 99.27% | 99.45% | 99.69% | 99.79% | 100.00% |
| Sand M | 0.00% | 2.67% | 14.88% | 61.39% | 92.88% | 95.82% | 96.56% | 97.18% | 97.79% | 98.20% | 100.00% |
| Sand S | 0.00% | 1.01% | 11.26% | 92.10% | 99.84% | 99.96% | 99.98% | 100.00% | 100.00% | 100.00% | 100.00% |

From the data in table 7, one could calculate the Fineness Modulus, as well as the parameters $D_{10}$ and $D_{90}$:

TABLE 8

| Sample | FM (0.063---> 4 mm) | D10 manual finder (linear) | | | | | D90 manual finder (linear) | | | | |
|---|---|---|---|---|---|---|---|---|---|---|---|
| | | D < 10 | passing D < 10 | D > 10 | passing D > 10 | D10 linear | D < 90 | passing D < 90 | D > 90 | passing D > 90 | D90 linear |
| Sand L | 4.50 | 0.063 | 3.00% | 0.125 | 12.87% | 0.107 | 0.25 | 42.57% | 0.5 | 94.25% | 0.479 |
| Sand M | 4.61 | 0.063 | 2.67% | 0.125 | 14.88% | 0.100 | 0.25 | 61.39% | 0.5 | 92.88% | 0.477 |
| Sand S | 5.04 | 0.063 | 1.01% | 0.125 | 11.26% | 0.117 | 0.125 | 11.25% | 0.25 | 92.10% | 0.247 |

From this data, one could easily calculate the agglomerability of the material:

TABLE 9

| Sample | FM (0.063--->4 mm) | Size parameters D10 | D90 | D90/D10 | Agglomerability Fineness * (D90/D10) |
|---|---|---|---|---|---|
| Sand L | 4.50 | 0.107 | 0.479 | 4.481943 | 20.2 |
| Sand M | 4.61 | 0.100 | 0.477 | 4.760867 | 22.0 |
| Sand S | 5.04 | 0.117 | 0.247 | 2.102201 | 10.6 |

After going through the method of the invention (steps (a) to (b)), no spheres were obtained, as predicted by equation 1 and definition of agglomerability.

Therefore, by-pass dust was added to the three types of sand, in a total of 10 different compositions (Table 10):

TABLE 10

| | Composition | | | | | | | |
|---|---|---|---|---|---|---|---|---|
| | Wastes [kg/m3] | | | | Wastes [% vol] | | | |
| N. | Sand L | Sand S | Sand M | By-Pass Dust | Sand L | Sand S | Sand M | By-Pass Dust |
| 1 | 1462 | 0 | 0 | 413 | 80% | 0% | 0% | 20% |
| 2 | 1233 | 0 | 0 | 348 | 80% | 0% | 0% | 20% |
| 3 | 1472 | 0 | 0 | 416 | 80% | 0% | 0% | 20% |
| 4 | 0 | 1244 | 0 | 723 | 0% | 65% | 0% | 35% |
| 5 | 0 | 1049 | 0 | 610 | 0% | 65% | 0% | 35% |
| 6 | 0 | 1252 | 0 | 728 | 0% | 65% | 0% | 35% |
| 7 | 0 | 0 | 1767 | 235 | 0% | 0% | 88.40% | 11.60% |
| 8 | 0 | 0 | 1674 | 425 | 0% | 0% | 80% | 20% |
| 9 | 0 | 0 | 1627 | 413 | 0% | 0% | 80% | 20% |
| 10 | 0 | 0 | 1373 | 348 | 0% | 0% | 80% | 20% |

The Fineness Modulus was calculated for the 10 new compositions (Table 11):

TABLE 11

| | Hardened properties Particle Size distribution [% of Passing at the following sieves in mm] | | | | | | | Fineness modulus (0.063--->4) | Paste volume [l/m3] | Agglomerability of the raw material | | Log10 (PV/Al* 100) | |
|---|---|---|---|---|---|---|---|---|---|---|---|---|---|
| N. | Bottom | 0.063 | 0.125 | 0.25 | 0.5 | 1 | 2 | 4 | $FM_{RM}$ | PV | Al | PV/Al | | k |
| 1 | 0.00% | 0.26% | 1.62% | 9.62% | 32.00% | 47.42% | 74.75% | 90.88% | 2.57 | 499.21 | 73.9751197 | 6.75 | 2.83 | 0.9068 |
| 2 | 0.00% | 0.59% | 1.77% | 6.62% | 8.33% | 9.15% | 10.51% | 15.22% | 0.52 | 570.85 | 73.9751197 | 7.72 | 2.89 | 0.1807 |
| 3 | 0.00% | 0.27% | 2.05% | 11.99% | 37.27% | 55.99% | 73.63% | 88.19% | 2.69 | 496.57 | 73.9751197 | 6.71 | 2.83 | 0.9529 |
| 4 | 0.00% | 0.73% | 3.01% | 10.50% | 22.13% | 48.62% | 74.64% | 88.28% | 2.48 | 557.59 | 76.56763173 | 7.28 | 2.86 | 0.8661 |
| 5 | 0.00% | 0.40% | 6.29% | 8.09% | 9.53% | 10.13% | 15.88% | 32.84% | 0.83 | 589.96 | 76.56763173 | 7.71 | 2.89 | 0.2881 |
| 6 | 0.00% | 0.23% | 1.70% | 9.96% | 33.65% | 61.79% | 74.53% | 85.69% | 2.68 | 559.15 | 76.56763173 | 7.30 | 2.86 | 0.9344 |
| 7 | 0.00% | 1.25% | 4.98% | 27.17% | 44.33% | 49.55% | 60.19% | 76.13% | 2.64 | 429.08 | 36.29034817 | 11.82 | 3.07 | 0.8579 |
| 8 | 0.00% | 0.04% | 1.80% | 19.00% | 44.70% | 54.88% | 76.03% | 92.56% | 2.89 | 443.80 | 73.74055245 | 6.02 | 2.78 | 1.0398 |
| 9 | 0.00% | 0.37% | 1.92% | 9.18% | 27.48% | 35.01% | 52.11% | 74.77% | 2.01 | 458.58 | 73.74055245 | 6.22 | 2.79 | 0.7189 |
| 10 | 0.00% | 0.39% | 1.73% | 7.42% | 11.99% | 15.73% | 37.71% | 64.32% | 1.39 | 505.47 | 73.74055245 | 6.85 | 2.84 | 0.4911 |

The agglomerability of the material improved and spheres were formed, using a mix design according to Table 12.

TABLE 12

| | Composition | | | | | | | | | | | | |
|---|---|---|---|---|---|---|---|---|---|---|---|---|---|
| | CEM I | | | Wastes [kg/m3] | | | | Percentage considered as fines [% vol] | | | | | Additives | |
| N. | 42.5N kg/m3 | w/b eff | w/b tot | Sand L | Sand S | Sand M | By-Pass Dust | Sand L | Sand S | Sand M | CEM I 42.5N | By-Pass Dust | [kg/m3] Flocculant | Density kg/m3 |
| 1 | 50 | 4 | 4.09 | 1462 | 0 | 0 | 413 | 3.00% | 1.01% | 2.67% | 95.71% | 80.06% | 0.75 | 2130.25 |
| 2 | 300 | 0.8 | 0.813 | 1233 | 0 | 0 | 348 | 3.00% | 1.01% | 2.67% | 95.71% | 80.06% | 0.75 | 2125.65 |
| 3 | 30 | 6.7 | 6.866 | 1472 | 0 | 0 | 416 | 3.00% | 1.01% | 2.67% | 95.71% | 80.06% | 0.75 | 2124.73 |
| 4 | 50 | 4.8 | 4.808 | 0 | 1244 | 0 | 723 | 3.00% | 1.01% | 2.67% | 95.71% | 80.06% | 0.75 | 2258.15 |
| 5 | 300 | 0.8 | 0.813 | 0 | 1049 | 0 | 610 | 3.00% | 1.01% | 2.67% | 95.71% | 80.06% | 0.75 | 2203.65 |
| 6 | 30 | 8 | 8.2 | 0 | 1252 | 0 | 728 | 3.00% | 1.01% | 2.67% | 95.71% | 80.06% | 0.75 | 2256.75 |
| 7 | 78 | 2.62 | 2.8 | 0 | 0 | 1767 | 235 | 3.00% | 1.01% | 2.67% | 95.71% | 80.06% | 0.75 | 2299.15 |
| 8 | 28 | 6.6 | 7.08 | 0 | 0 | 1674 | 425 | 3.00% | 1.01% | 2.67% | 95.71% | 80.06% | 0.75 | 2325.99 |
| 9 | 50 | 4 | 4.26 | 0 | 0 | 1627 | 413 | 3.00% | 1.01% | 2.67% | 95.71% | 80.06% | 0.75 | 2303.75 |
| 10 | 300 | 0.7 | 0.733 | 0 | 0 | 1373 | 348 | 3.00% | 1.01% | 2.67% | 95.71% | 80.06% | 0.75 | 2241.65 |

This experiment shows that with the method according to the invention, it is possible to agglomerate finely divided material, even when initially said agglomeration did not seem possible.

Example 4

This example was carried out to test the effect of adding pigments into the mix. Seven samples were prepared, one using only white cement, finely divided material (sand), water and a flocculant, according to the method of the invention, and the other six were prepared in a similar way, only with the addition of six different oxide based pigments in step a). All the pigments were added in a concentration equal to 5 kg/m$^3$.

TABLE 13

| | | CEM I 52.5 white | | | Aggregates | | Additives [kg/m3] | |
|---|---|---|---|---|---|---|---|---|
| N. | Name | kg/m3 | w/b eff | w/b tot | 0/4 round | 0/4 crushed | Flocculent | Pigments |
| 1 | Gravel from sand—white | 300 | 0.7 | 0.76 | 0% | 100% | 0.5 | — |
| 2 | Gravel from sand—white cem + red | 300 | 0.7 | 0.76 | 0% | 100% | 0.5 | red |
| 3 | Gravel from sand—white cem + green | 300 | 0.7 | 0.76 | 0% | 100% | 0.5 | green |
| 4 | Gravel from sand—white cem + yellow | 300 | 0.7 | 0.76 | 0% | 100% | 0.5 | yellow |
| 5 | Gravel from sand—white cem + black | 300 | 0.7 | 0.76 | 0% | 100% | 0.5 | black |
| 6 | Gravel from sand—white cem + green + yellow | 300 | 0.7 | 0.76 | 0% | 100% | 0.5 | green + yellow |
| 7 | Gravel from sand—white cem + blue | 300 | 0.7 | 0.76 | 0% | 100% | 0.5 | blue |

The different samples were mixed for 10-15 minutes after the flocculant was added. Spherical aggregates were formed in all 7 examples; the pigments had no negative effect on the spheres obtained.

The samples with pigments agglomerated in the same way as sample 1, which had no pigment. The size of the aggregates produced was similar. Table 14 and Table 15 show an average of the properties of the aggregates produced.

TABLE 14

| N. | Name | Hardened properties | Particle Size distribution [% of Passing at the following sieves in mm] | | | | | | | |
|---|---|---|---|---|---|---|---|---|---|---|
| | | Los Angeles 7 days | Bottom | 0.064 | 0.125 | 0.25 | 0.5 | 1 | 2 | 4 |
| 1 | Gravel from sand—white | 47.2 | 0.00% | 1.13% | 3.08% | 4.59% | 5.71% | 7.46% | 15.62% | 36.60% |
| 2 | Gravel from sand—white cem + red | | | | | | | | | |
| 3 | Gravel from sand—white cem + green | | | | | | | | | |
| 4 | Gravel from sand—white cem + yellow | | | | | | | | | |
| 5 | Gravel from sand—white cem + black | | | | | | | | | |
| 6 | Gravel from sand—white cem + green + yellow | | | | | | | | | |
| 7 | Gravel from sand—white cem + blue | | | | | | | | | |

TABLE 15

| N. | Name | Fineness modulus | Paste volume [l/m3] | Agglomerability of the raw material | PV/Al | Log10 (PV/Al*100) | k |
|---|---|---|---|---|---|---|---|
| 1 | Gravel from sand—white | 0.74 | 323 | 199 | 1.62 | 2.21 | 0.335567972 |
| 2 | Gravel from sand—white cem + red | | | | | | |
| 3 | Gravel from sand—white cem + green | | | | | | |
| 4 | Gravel from sand—white cem + yellow | | | | | | |
| 5 | Gravel from sand—white cem + black | | | | | | |
| 6 | Gravel from sand—white cem + green + yellow | | | | | | |
| 7 | Gravel from sand—white cem + blue | | | | | | |

According to the method of the invention, one can predict the fineness modulus of the granules produced, and hence how fine or coarse the final material will be, through the formula:

$$FM_{FM} = 0.336 \cdot \text{Log}_{10}\left(\frac{PV}{199} \cdot 100\right)$$

The aggregates produced were used to produce patterns in a pathway at a municipal park.

Example 5

In this example, another raw material other than sand was tried, namely crushed brick. First, the raw material was characterized (Tables 16-19):

TABLE 16

| Sample | Particle Size distribution [% of Passing at the following sieves in mm] | | | | | | | |
|---|---|---|---|---|---|---|---|---|
| | Bottom | 0.063 | 0.125 | 0.25 | 0.5 | 1 | 2 | 4 |
| Crushed Bricks—0/4 | 0.00% | 0.96% | 5.23% | 14.28% | 26.16% | 43.41% | 79.27% | 100.00% |

TABLE 18

| | D10 manual finder (linear) | | | | |
|---|---|---|---|---|---|
| Sample | D < 10 | passing D < 10 | D > 10 | passing D > 10 | D10 linear |
| Crushed Bricks - 0/4 | 1.25E−01 | 5.23% | 2.50E−01 | 14.28% | 0.191 |

TABLE 19

| | D90 manual finder (linear) | | | | |
|---|---|---|---|---|---|
| Sample | D < 90 | passing D < 90 | D > 90 | passing D > 90 | D90 linear |
| Crushed Bricks - 0/4 | 2 | 79.27% | 4 | 100.00% | 3.035 |

TABLE 20

| | FM | Size parameters | | | Agllomerability |
|---|---|---|---|---|---|
| Sample | (0.063--->4 mm) | D10 | D90 | D90/D10 | FM * (D90/D10) |
| Crushed Bricks - 0/4 | 2.69 | 0.191 | 3.035 | 15.90 | 43 |

It is predicted that the material can be easily granulated.
Ten mix designs were prepared according to the method of the invention:

TABLE 21

| | | Composition | | | | | | | |
|---|---|---|---|---|---|---|---|---|---|
| N. | Name | CEM I 52.5 R Vigier kg/m3 | Fly ash kg/m3 | TOTAL BINDER kg/m3 | w/b eff | w/b tot | Aggregates Crushed Bricks 0/4 | Additives [kg/m3] Flocculant | Density kg/m3 |
| 1 | Gravel from brick-v1 | 16 | 7 | 23 | 3 | 10.4 | 1626 | 0.75 | 1808.40 |
| 2 | Gravel from brick-v2 | 33 | 15 | 48 | 1.3 | 4.848 | 1622 | 0.75 | 1814.98 |
| 3 | Gravel from brick-v3 | 23 | 0 | 23 | 3.6 | 10.91 | 1602 | 0.75 | 1875.93 |
| 4 | Gravel from brick-v4 | 45 | 0 | 45 | 2 | 5.677 | 1576 | 0.75 | 1876.47 |
| 5 | Gravel from brick-v5 | 300 | 0 | 300 | 0.7 | 1.186 | 1214 | 1.5 | 1869.80 |
| 6 | Gravel from brick-v6 | 400 | 0 | 400 | 0.6 | 0.89 | 1103 | 0.75 | 1859.00 |
| 7 | Gravel from brick-v7 | 250 | 0 | 250 | 0.6 | 1.153 | 1351 | 0.75 | 1889.25 |
| 8 | Gravel from brick-v8 | 300 | 0 | 300 | 0.6 | 1.049 | 1268 | 1.5 | 1882.70 |
| 9 | Gravel from brick-v9 | 250 | 0 | 250 | 0.8 | 1.34 | 1261 | 1.5 | 1846.00 |
| 10 | Gravel from brick-v10 | 200 | 0 | 200 | 1 | 1.657 | 1289 | 1.5 | 1820.40 |

The results are summarized in Tables 22 and 23:

TABLE 22

| | | Particle Size distribution [% of Passing at the following sieves in mm] | | | | | | | |
|---|---|---|---|---|---|---|---|---|---|
| N. | Name | Bottom | 0.063 | 0.125 | 0.25 | 0.5 | 1 | 2 | 4 |
| 1 | Gravel from brick-v1 | 0.00% | 1.55% | 3.75% | 9.11% | 17.58% | 34.81% | 74.87% | 99.87% |
| 2 | Gravel from brick-v2 | 0.00% | 2.22% | 6.07% | 13.19% | 22.58% | 39.28% | 77.93% | 99.91% |
| 3 | Gravel from brick-v3 | 0.00% | 0.63% | 1.30% | 2.78% | 9.53% | 25.81% | 68.58% | 99.80% |
| 4 | Gravel from brick-v4 | 0.00% | 0.60% | 1.33% | 2.34% | 6.31% | 24.18% | 65.65% | 99.32% |
| 5 | Gravel from brick-v5 | 0.00% | 0.15% | 0.34% | 0.48% | 0.64% | 0.93% | 2.67% | 10.93% |
| 6 | Gravel from brick-v6 | 0.00% | 0.16% | 0.54% | 0.76% | 1.01% | 1.50% | 4.40% | 17.20% |
| 7 | Gravel from brick-v7 | 0.00% | 0.08% | 0.22% | 0.35% | 0.50% | 1.22% | 11.16% | 39.39% |
| 8 | Gravel from brick-v8 | 0.00% | 0.11% | 0.20% | 0.27% | 0.34% | 0.49% | 3.46% | 13.55% |
| 9 | Gravel from brick-v9 | 0.00% | 0.08% | 0.25% | 0.45% | 0.70% | 1.40% | 8.55% | 30.32% |
| 10 | Gravel from brick-v10 | 0.00% | 0.10% | 0.42% | 0.69% | 1.05% | 1.95% | 9.91% | 30.48% |

TABLE 23

| N. | Name | Fineness modulus (0.063->4) | Paste volume [l/m3] PV | Agglomerability of the raw material | PV/AI | Log10 (PV/AI * 100) | k |
|---|---|---|---|---|---|---|---|
| AVERAGE | Gravel from Brick | 1.11 | 207.02 | 42.82 | 4.83 | 2.62 | 0.47 |

$$FM_{FM} = 0.47 \cdot \text{Log}_{10}\left(\frac{PV}{43} \cdot 100\right)$$

The invention claimed is:

1. A method to agglomerate finely divided material into aggregates, the aggregates being larger than the finely divided material, comprising the steps of:
   (a) selecting a finely divided material to form a final aggregate according to an agglomerability factor AI, the agglomerability factor AI being between 30 and 1000 and defined as $$AI = FM_{RM} \times \frac{D_{90}}{D_{10}}$$

wherein $FM_{RM}$ is the fineness modulus of the finely divided material used in step (a), defined as the sum of the total percentage of sample that pass a series of sieves of 0.063 mm, 0.125 mm, 0.250 mm, 0.500 mm, 1 mm, 2 mm and 4 mm, $FM_{RM} = \Sigma_{(0.063\ mm - 4\ mm)}$ passing %, wherein $D_{10}$ is the sieve size [mm] at which the passing is 10%, wherein $D_{90}$ is the sieve size [mm] at which the passing is 90% and $D_{90}/D_{10}$ is a monogranular index,
   (b) mixing the finely divided material, binder and water in a mixer,
   (c) adding an agglomerating agent to the mix formed in step (b) and
   (d) mixing constantly.

2. Method according to claim 1, wherein in step (b) the finely divided material, binder and water are added simultaneously.

3. Method according to claim 1, wherein in step (b) water and binder are added gradually to said finely divided material.

4. Method according to claim 1, wherein said finely divided material is selected from the group consisting of sand, clay, glass, stone powder, bypass dust, limestone, crushed brick, brick powder and crushed stone and a combination thereof.

5. Method according to claim 1, wherein said finely divided material is at a concentration in the range of 0.1 ton/m³ to 3.2 ton/m³ with respect to the final mix.

6. Method according to claim 1, wherein said binder is selected from the group consisting of powder cement, cement mixed in water, lime, silica fume, fly ash and slag and a combination thereof.

7. Method according to claim 1, wherein said binder is at a concentration in the range of 10 to 1000 kg/m³ with respect to the final mix.

8. Method according to claim 1, wherein in step (b) a superplasticizer is added to the mix.

9. Method according to claim 8, wherein said superplasticizer is selected from the group consisting of melamine, naphthalene, lignosulfonate and polycarboxylates and a combination thereof.

10. Method according to claim 8, wherein the solid active content of the superplasticizer is at a concentration in the range of 0.1 kg/m³ to 10 kg/m³.

11. Method according to claim 1, wherein in step (b) water to binder ratio is in the range of 0.5 to 10.

12. Method according to claim 1, wherein said agglomerating agent is selected from the group consisting of cellulose, chitosan, polyacrylics, polyamines, polyethylene imines, polyvinylalcohols, polysaccharides, polyacrylamides, and co-polymers thereof, collagen, acrylamide, lactic acid, methacrylic acid, methacrylate, hydroxyethyl, ethylene glycol, ethylene oxide, acrylic acid, inorganic flocculants, inorganic coagulants and a combination thereof.

13. Method according to claim 1, wherein said agglomerating agent is inorganic flocculants or polysaccharides.

14. Method according to claim 1, wherein the solid active content of the agglomerating agent is at a concentration in the range of 0.1 kg/m³ to 5 kg/m³.

15. Method according to claim 1, wherein the aggregates obtained in step (c) are poured out of the mixer and dried for at least 6 hours.

* * * * *